(12) United States Patent
Koopmans et al.

(10) Patent No.: US 7,765,988 B2
(45) Date of Patent: Aug. 3, 2010

(54) METHOD FOR AN INTERNAL COMBUSTION ENGINE, AND AN INTERNAL COMBUSTION ENGINE

(75) Inventors: Lucien Koopmans, Hovås (SE); Göran Karlsson Lindhardt, Torslanda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 551 days.

(21) Appl. No.: 11/685,254

(22) Filed: Mar. 13, 2007

(65) Prior Publication Data

US 2007/0215120 A1 Sep. 20, 2007

(30) Foreign Application Priority Data

Mar. 15, 2006 (EP) .................................. 06111189

(51) Int. Cl.
*F02D 41/30* (2006.01)
(52) U.S. Cl. .................................................... 123/491
(58) Field of Classification Search ................ 123/491, 123/179.15
See application file for complete search history.

(56) References Cited

U.S. PATENT DOCUMENTS

| | | | | |
|---|---|---|---|---|
| 6,213,086 B1 * | 4/2001 | Chmela et al. | ............... | 123/276 |
| 6,390,054 B1 * | 5/2002 | Yang | ............... | 123/295 |
| 6,536,407 B1 * | 3/2003 | Denbratt | ............... | 123/311 |
| 6,923,167 B2 * | 8/2005 | Flowers | ............... | 123/568.15 |
| 6,957,640 B1 * | 10/2005 | Liu et al. | ............... | 123/305 |
| 7,021,276 B2 * | 4/2006 | Liu et al. | ............... | 123/299 |
| 7,104,248 B2 * | 9/2006 | Weiss | ............... | 123/305 |
| 7,121,255 B2 * | 10/2006 | Liu et al. | ............... | 123/305 |
| 7,213,585 B2 * | 5/2007 | Yang | ............... | 123/543 |
| 7,255,095 B1 * | 8/2007 | Brevick et al. | ............... | 123/568.11 |
| 7,287,521 B2 * | 10/2007 | Yang | ............... | 123/556 |
| 7,305,955 B2 * | 12/2007 | Brevick et al. | ............... | 123/179.21 |
| 7,461,628 B2 * | 12/2008 | Blumberg et al. | ............... | 123/304 |
| 7,481,185 B1 * | 1/2009 | Park et al. | ............... | 123/21 |
| 2004/0244732 A1 * | 12/2004 | Kojic et al. | ............... | 123/21 |
| 2005/0121009 A1 * | 6/2005 | Flowers | ............... | 123/568.15 |
| 2006/0145482 A1 * | 7/2006 | Roethler et al. | ............... | 290/40 C |
| 2007/0062178 A1 * | 3/2007 | Yang | ............... | 60/278 |
| 2007/0062490 A1 * | 3/2007 | Yang | ............... | 123/435 |
| 2007/0215120 A1 * | 9/2007 | Koopmans et al. | ............... | 123/491 |
| 2007/0227503 A1 * | 10/2007 | Hitomi et al. | ............... | 123/406.45 |
| 2007/0289572 A1 * | 12/2007 | Petridis et al. | ............... | 123/305 |
| 2008/0127933 A1 * | 6/2008 | Blumberg et al. | ............... | 123/304 |
| 2008/0173277 A1 * | 7/2008 | Otterspeer et al. | ............... | 123/295 |
| 2008/0215226 A1 * | 9/2008 | Sauer et al. | ............... | 701/102 |
| 2009/0048756 A1 * | 2/2009 | Park et al. | ............... | 701/101 |

* cited by examiner

*Primary Examiner*—Stephen K Cronin
*Assistant Examiner*—Arnold Castro
(74) *Attorney, Agent, or Firm*—Raymond L. Coppiellie; Alleman Hall McCoy Russell & Tuttle LLP

(57) ABSTRACT

The description relates to an internal combustion engine, and a method for an internal combustion engine with at least one cylinder, at each of which at least one spark providing device for ignition being provided. The engine is operated, in connection to a start procedure of the engine, in a controlled self-ignition mode comprising at least one controlled combustion without spark ignition. The controlled combustion without spark ignition can comprise homogeneous charge compression ignition (HCCI).

31 Claims, 4 Drawing Sheets

METHOD FOR AN INTERNAL COMBUSTION ENGINE, AND AN INTERNAL COMBUSTION ENGINE

TECHNICAL FIELD

The present invention relates to improving performance of an internal combustion engine with spark ignition at engine start, and in particular to reducing the knocking in an internal combustion engine in a vehicle, while still providing a desirable behavior from a user/driver point of view during a "hot" start.

BACKGROUND AND SUMMARY OF THE INVENTION

When the engine is stopped after a period of operation during which the temperature of the engine, e.g. coolant, oil and material, has increased above a certain level, and relatively shortly after that started again ("hot" start), the first couple of combustions can be in the form of knocking when the start procedure is the same as during a cold engine. In brief, the reason is that when the engine is stopped, it will heat the air in the inlet manifold, and a high inlet air temperature and pressure combined with a low engine speed at restart can easily result in knocking. The high inlet pressure is due to the pressure reaching atmospheric pressure when the engine stops.

Accordingly, the present invention is directed to improving performance of an internal combustion engine with spark ignition at a starting procedure of the engine, and in particular to reducing the knocking in an internal combustion engine in a vehicle, while still providing a desirable behavior from a user/driver point of view during a "hot" start.

The method for improving performance of an internal combustion engine with at least one cylinder, at each of which at least one spark providing device for ignition being provided includes: in connection to a start procedure of the engine, operating the engine in a controlled self-ignition mode comprising at least one controlled combustion without spark ignition.

The provision of at least one spark providing device, for example a spark plug, at each cylinder, means that the engine can be operated in a spark ignition mode.

The invention solves the problem of knocking when starting a hot engine in an elegant and simple manner. The inventive idea can be viewed as instead of attempting to eliminate the pre-ignitions at a "hot" start, the pre-ignition behavior is "transformed" into cycles with controlled combustion without spark ignition. This means that there is no flame propagation combustion. Instead, auto-ignition is controlled to an extent that no engine knock will occur. The invention will eliminate the problem of avoiding knocking after engine start during "hot" conditions, fuel qualities and engine crank speed at start, but still the invention will provide an engine than provides torque quickly at the startup phase. In other words, the number of cranks without combustion is reduced, which is advantageous from a user/driver point of view in case the engine is provided in a vehicle.

In an exemplary embodiment, the controlled combustion without spark ignition comprises homogeneous charge compression ignition (HCCI), or controlled auto-ignition (CAI). However, controlled combustion without spark ignition does not mean that the fuel/air mixture has to be totally homogeneous. The mixture can in certain embodiments be more or less stratified, for example if direct fuel injection is used. As explained further below, the invention can be used in combination with any fuel injection system.

In case of HCCI cycles, in order to achieve them, the homogeneous air-fuel mixture can be created either in the inlet manifold or in the cylinder by early fuel injection and fast fuel-air mixing. A homogeneous air-fuel mixture in the inlet manifold may be achieved, as in the case of a conventional Otto cycle engine, by using a fuel-aspirating carburetor or by using a low-pressure fuel injection pump and nozzle. It should be noted that the HCCI mode gives reduced levels of nitrous oxide (NOx) in the exhaust gases, due to the low combustion temperature of the diluted mixture, as well as reduced soot or particulates.

In another embodiment, when the engine is operated in the controlled self-ignition mode, a mixture of fuel and air supplied for the combustion is lean. The chemical kinetics of a lean mixture proceed much slower than those of a stoichiometric or rich mixture, so that the pressure rise per crankangle degree is reduced. Also, the low amount of fuel causes the load, hence the maximum cylinder pressure level, to reduce, and therefore, in addition to avoiding knocking, the noise, vibration & harshness (NVH) level will be reduced.

In yet another embodiment, wherein the controlled self-ignition mode comprises a plurality of controlled combustions without spark ignition, in connection to which the mixture of fuel and air is made gradually richer. Thereby, when engine is operated so as to provide a plurality of controlled combustions without spark ignition, for each consecutive combustion, (consecutive firing cylinder), the fuel amount is increased. This means that, during a start of a hot engine where the air in an inlet manifold has been heated by the engine, an adaptation is made to the gradual entry during the starting sequence of cooler air into the inlet manifold, so that the fuel mixture can gradually become richer without the risk of knocking. Also, for each combusting cycle, the engine speed increases causing the auto-ignition timing to be delayed and the pressure rise per crankangle to be decreased, so that for each inducted air volume per engine cycle, the pressure in the manifold will reduce. This will also contribute to the allowance of a gradual increase of the fuel amount supplied, which in turn allows a quicker torque increase at engine start.

Also, the number of controlled combustions without spark ignition is at least partly dependent upon the temperature of a part of the engine at the start procedure, preferably the temperature before the starting sequence. Thereby, the number of controlled combustions without spark ignition can be at least partly dependent upon the temperature before the starting sequence of a cooling fluid of the engine. As an alternative, or additionally, the number of controlled combustions without spark ignition can be at least partly dependent upon the temperature before the start sequence of air in an inlet manifold of the engine.

In another exemplary embodiment, after the controlled self-ignition mode, the engine is operated in a spark ignition (SI) mode. Additionally, before the controlled self-ignition mode, a throttle valve of the engine is controlled so as to assume a not fully open position, which can be a position in which the throttle valve is less than twenty percent open, preferably a fully closed position. In any case, preferably, before the controlled self-ignition mode, the throttle valve is controlled so that there is a substantial pressure drop over the throttle valve. Additionally, at least one fuel injector of the engine can be controlled so that, when the throttle valve is in the not fully open position, an amount of fuel injected is equal to or less than a fuel injection threshold value, which, in one embodiment, may correspond to no injection of fuel. This means that the throttle can be closed during the first couple of cylinder compressions of the engine without fuel injection. Thereby, the air captured in the manifold will expand, hence the temperature and pressure of the air will drop. Both temperature and pressure affect the controlled auto-ignition timing and by reducing the air temperature and pressure, the controlled auto-ignition can be phased later in the cycles, which reduces the maximum pressure.

Preferably, an amount of throttled cylinder compressions, during which the throttle valve is controlled so as to assume a not fully open position, is dependent upon the temperature in an inlet manifold of the engine. Thereby, preferably the amount of throttled cylinder compressions is increased with increased temperature in the inlet manifold. In this way, the controlled auto-ignition timing is always kept within an acceptable crank-angle interval round piston TDC. The amount of throttled cylinder compressions can also be dependent upon the pressure in the inlet manifold.

As mentioned above, the invention is especially advantageous during "hot" starts, which means that, preferably, the inventive start procedure, including the engine being operated in the controlled self-ignition mode, is carried out if at least a part of the engine, e.g. an engine cooling fluid or the material of an engine component, has a temperature that is higher than a threshold temperature. Alternatively, or in addition, the inventive start procedure can be dependent on the air in an inlet manifold of the engine having a temperature that is higher than an inlet manifold air threshold temperature. Also, alternatively, or in addition, the start procedure can be dependent on the pressure in the inlet manifold of the engine being higher than an inlet manifold pressure threshold value.

BRIEF DESCRIPTION OF THE DRAWINGS

The invention is described with reference to the drawings, in which.

DETAILED DESCRIPTION OF PREFERRED EMBODIMENT(S)

Figure 4:
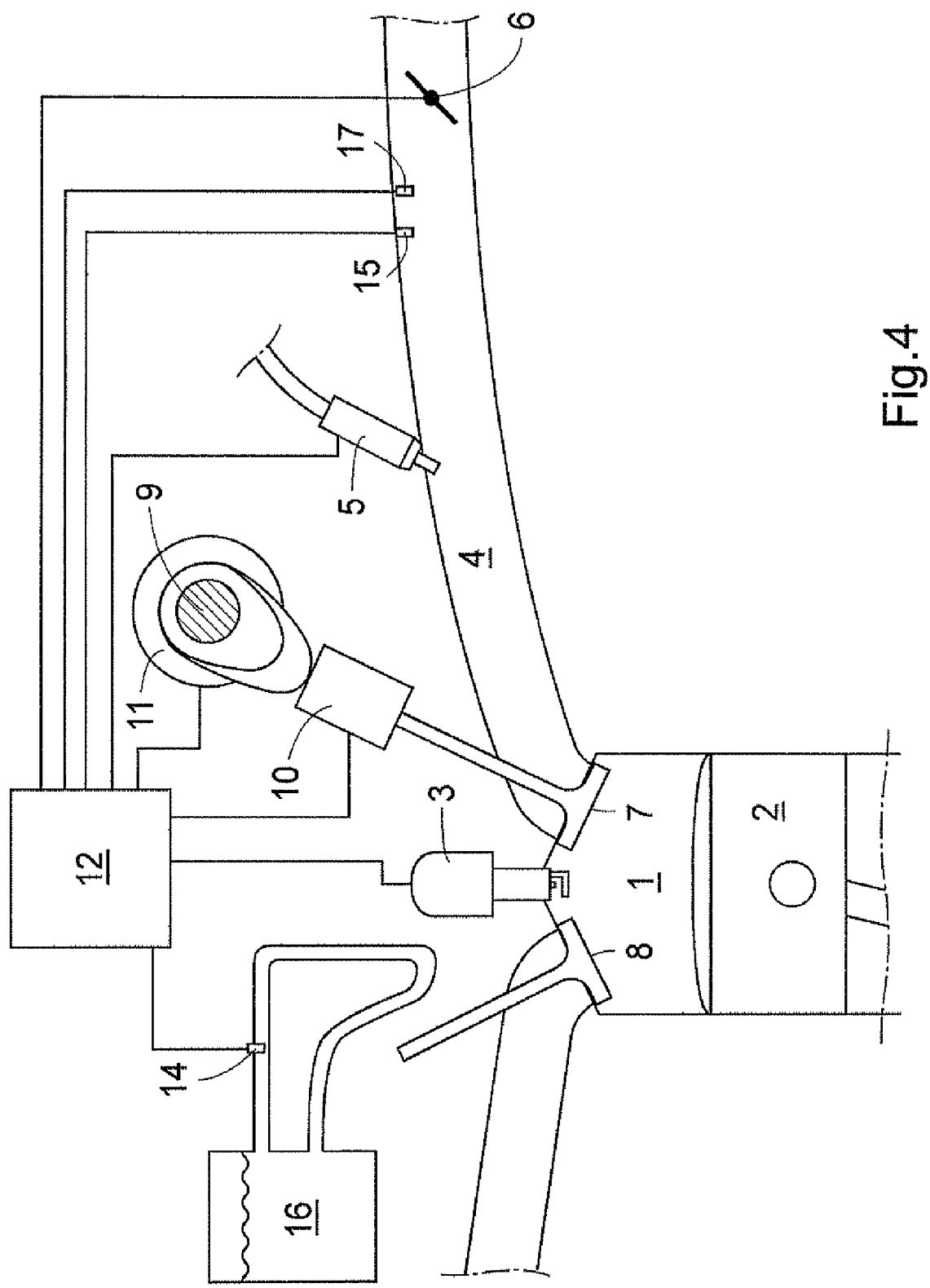
FIG. 4 shows schematically parts of an internal combustion engine.

FIG. 4 shows schematically parts of an internal combustion engine for a vehicle including a cylinder 1 with a piston 2, and a spark providing device in the form of a spark plug 3. Of course, the invention is applicable to spark ignition engines with any number of cylinders. An inlet manifold 4 is provided with a fuel injector 5 and a throttle valve 6 for providing a mixture of fuel and air into the cylinders 1, via respective inlet valves 7, in addition to which respective exhaust valves 8 being provided to control access to an exhaust manifold. The inlet manifold 4 can be provided in a variety of manners, and for this presentation, it should be understood as an arrangement providing a volume upstream the inlet valve(s) 6. It should also be noted that the invention can be used in engines provided with direct fuel injectors instead of a port fuel injector 5.

At a cam shaft 9 for the inlet valves 7, a cam profile switching (CPS) system 10 and variable valve timing (VVT) system 11 (also called cam phasing system) are provided in a manner known in the art, to allow variation of the lift profile and timing, respectively, of the inlet valves 7. However, it should be noted that the invention is equally applicable to engines without CPS and/or VVT systems.

An engine control unit (ECU) 12, has computational and data storage capacities, and is provided as one device, or a plurality of logically connected devices. The ECU 12 is adapted to control the ignition timing of the spark plug(s) 3, the flow of fuel through the fuel injector 5, the throttle valve 6 position, the CPS system 10 and the VVT system 11. Further, the ECU 12 is adapted to receive, by means of temperature sensors 14, 15, data corresponding to the temperature of a cooling fluid 16 of the engine, and the temperature in the inlet manifold 4, respectively. Also, the ECU 12 is adapted to receive, by means of a pressure sensor 17, data corresponding to the pressure in the inlet manifold 4. Alternatively, or in addition, a cylinder pressure sensing device can be used. As a further alternative, a temperature sensor adapted to measure the surface temperature the engine, e.g. the inlet manifold, can be used.

Figure 5:
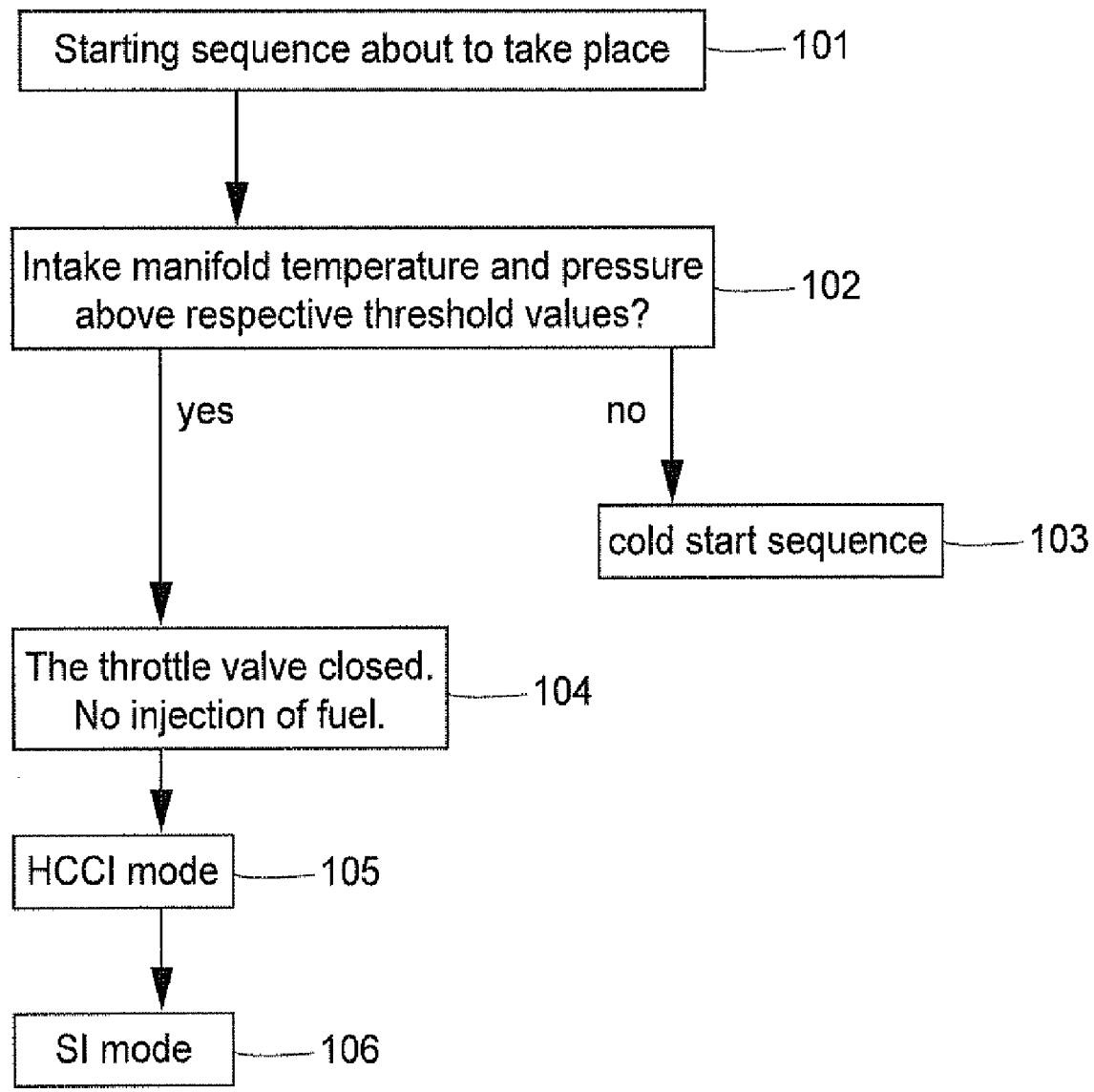
FIG. 5, is a block diagram depicting steps in a preferred embodiment of the method according to the invention.

Reference is made to FIG. 5, which is a block diagram depicting steps in a preferred embodiment of the method according to the invention. The ECU 12 is adapted in a manner known in the art to determine 101 whether a starting sequence of the engine is about to take place. Such a determination can for example be made, in a manner known in the art, by detecting a typical engine starting maneuver by a driver of the vehicle, for example the insertion of an ignition key.

Upon detection 101 of a starting sequence about to take place, the temperature and pressure in the inlet manifold 4 are determined 102. If the inlet manifold temperature and pressure are above respective threshold values indicating a "hot start limit", a hot start sequence, described below, is carried out. If the inlet manifold temperature and pressure are below the respective threshold values, a normal cold start sequence is carried out 103. As an alternative, only the manifold inlet temperature can be used for determining whether a hot start sequence is to be carried out. As a further alternative, the cooling fluid 16 temperature can be used for determining whether a hot start sequence is to be carried out.

Regardless whether the inlet manifold temperature, the inlet manifold pressure, and/or the cooling fluid temperature is used for determining whether a hot start sequence is to be carried out, the respective threshold value is preferably determined based on the engine speed when the engine is cranking at start. The higher the engine speed, the higher the threshold value. In addition, the threshold value can be dependent on the fuel quality, mixture quality, inlet valve closing timing (effective compression ratio), inlet pressure and/or geometric compression ratio.

In the hot start sequence, the throttle valve 6 is moved 104 to a closed position before or at the time when the crankshaft of the engine starts rotating. Also, in an initial phase of the start sequence, there is no injection of fuel via the fuel injector 5. Thus, the first couple of cylinder compressions of the engine will take place with closed throttle and no fuel injection, and such engine operation events are here referred to as throttled cylinder compressions. The ECU 12 is adapted to determine the amount of throttled cylinder compressions in dependence upon the inlet manifold temperature and pressure, detected, as described above, before the time when the crankshaft of the engine starts rotating.

Figure 1:
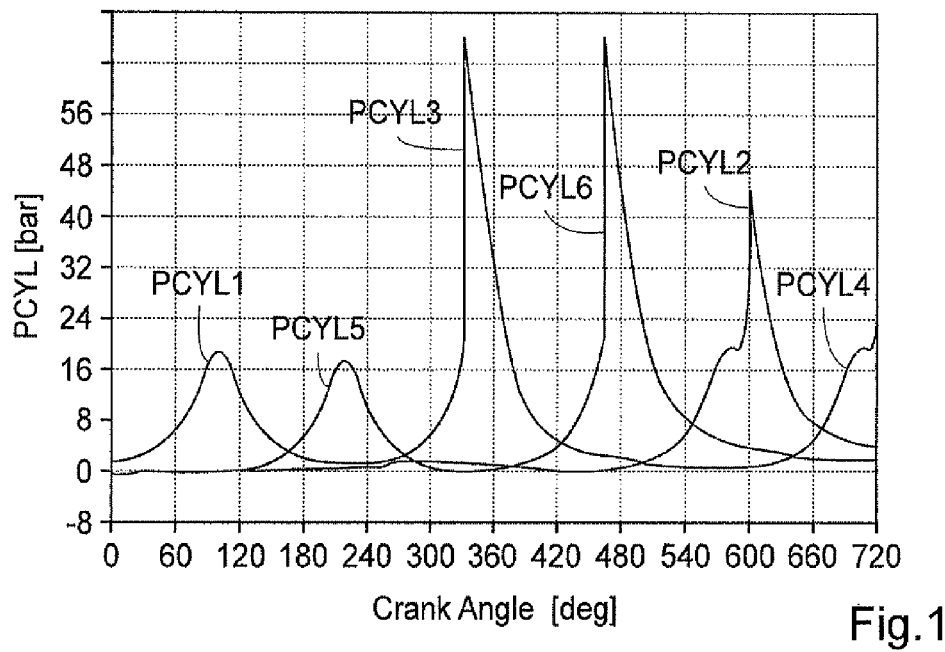
FIG. 1 shows cylinder-pressure traces, when using a known method at engine start, for cylinders, as a function of crank-angle measured directly after the crankshaft has started rotating.
Figure 2:
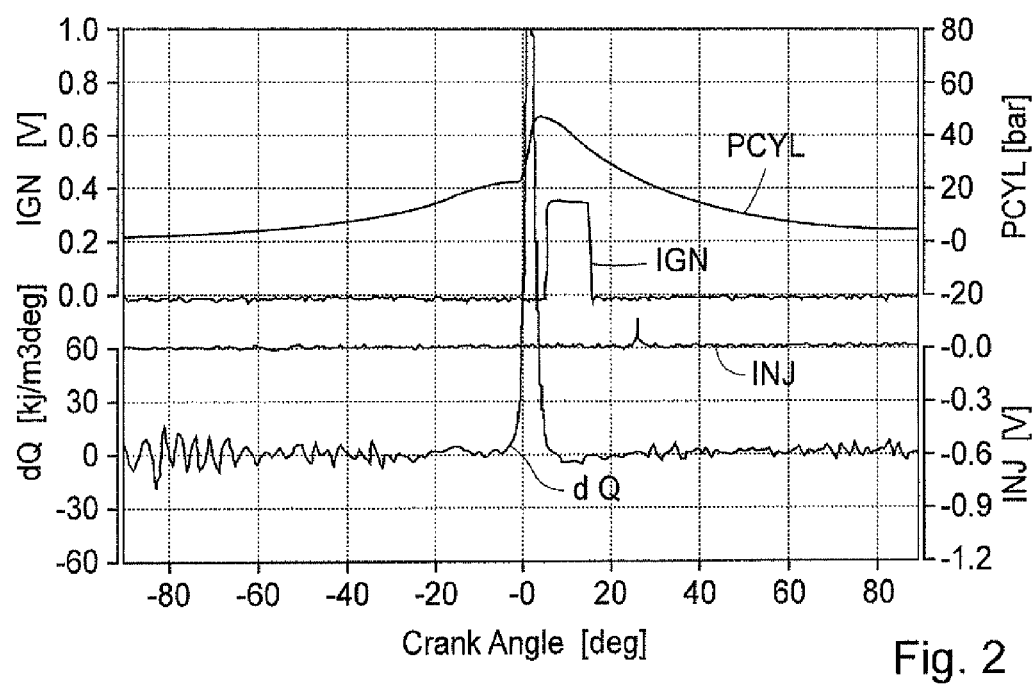
FIG. 2 depicts a part of a cycle in an engine cylinder, when using a known method at engine start, with cylinder pressure, ignition timing, injection timing, and the rate of heat release.
Figure 3:
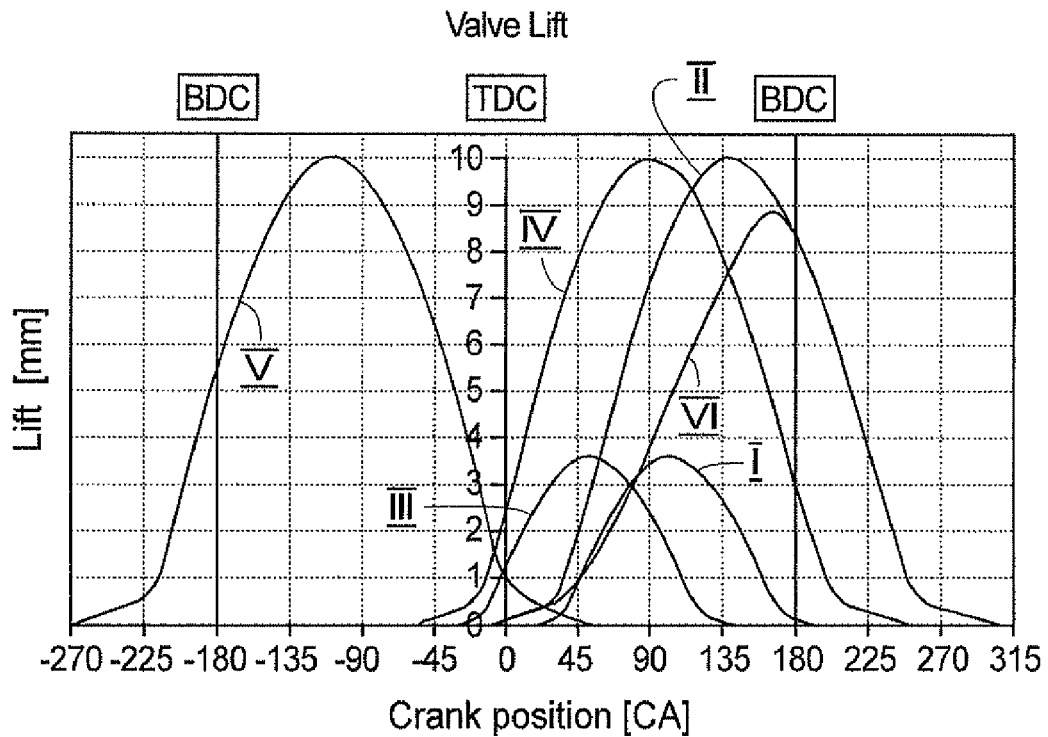
FIG. 3 shows typical valve lift curves in an engine with CPS and VVT systems.
Figure 6:
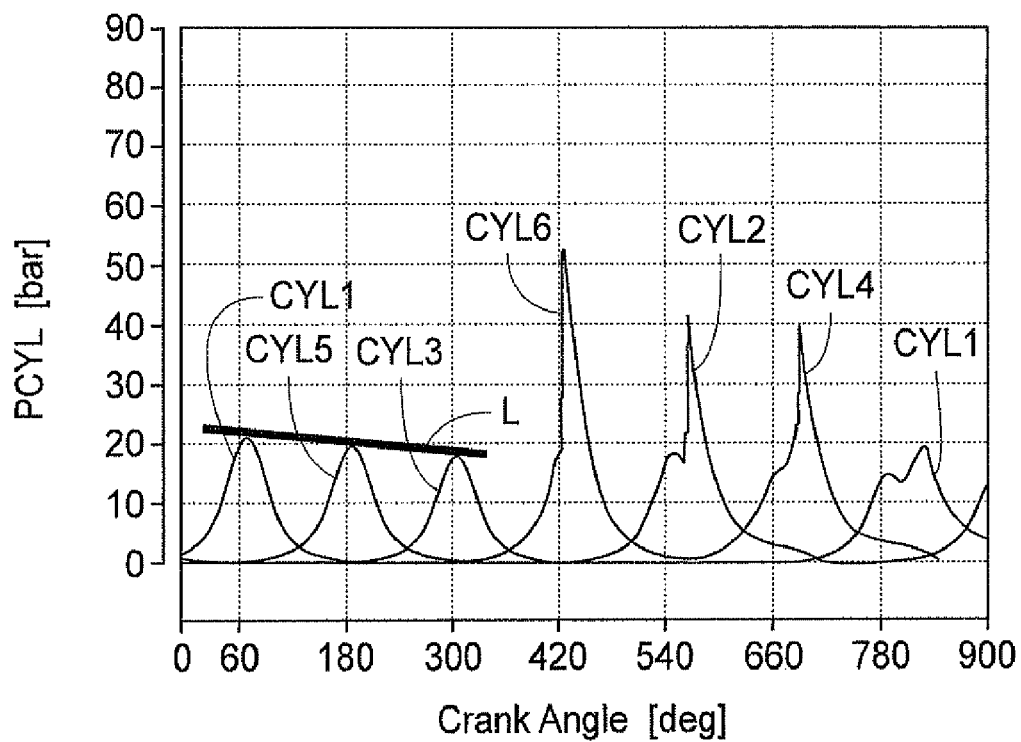
FIG. 6 shows cylinder-pressure traces, when using the inventive method at engine start, for cylinders, as a function of crank-angle.

FIG. 6 shows cylinder-pressure traces, during the hot start sequence, as a function of crank-angle. There are three consecutive throttled cylinder compressions in cylinders denoted as CYL1, CYL5 and CYL3. The thick sloping line L in FIG. 6 indicates that the maximum pressure is reduced due to the expansion through the closed throttle.

Referring again to FIG. 5, the throttled cylinder compressions are followed by a controlled self-ignition mode, in which the engine control unit 12 controls the spark providing device 3, the throttle valve 6 and the fuel injector 5 so as to provide a number of controlled combustions without spark ignition 105. In this example, the controlled self-ignition mode is a homogeneous charge compression ignition (HCCI) mode 105 engaged during a number of cylinder compression of the engine. It should be noted that the controlled self-ignition mode can include only one combustion. In this example, during the HCCI mode, the mixture of fuel and air supplied to at least one of the cylinders of the engine is lean, but made gradually richer as the HCCI mode operation proceeds. The number of cylinder compressions at which the engine operates in the HCCI mode is dependent upon the temperature of the cooling fluid 16, detected, as described above, before the time when the crankshaft of the engine starts rotating.

As a specific example of the HCCI mode: for very high temperatures, the lambda (air/fuel ration divided by the stoichiometric air/fuel ratio) of the first combustion in a typical engine of a vehicle could be in the order of 5, where-after it will be decreased by injecting more fuel for each consecutive firing cylinder until the mixture reaches the flame propagation limit and can be ignited by a spark, i.e. the HCCI mode operation of the engine is followed by a spark ignition (SI) mode. In the HCCI mode, the second, third, forth and fifth firing cylinder could therefore have a lambda in the order of 2.5, 2.0, 1.8 and 1.4 respectively, depending on the calibration. Also, preferably, depending on a calibrated load threshold/the idle speed, etc., during the HCCI mode, the throttle valve 6 is controlled so as to gradually open as the SI mode approaches.

As an alternative, the duration of the HCCI mode can be dependent on the temperature of air in the inlet manifold 4, but it should be noted that this temperature could be related to the cooling fluid 16 temperature. When the temperature of the engine, e.g. the cooling fluid 16, is higher than the ambient air temperature, the inlet air temperature will approach the cooling fluid temperature (and engine material temperature) after the engine has been stopped. For technical reasons related to engine control and because of the location of the air temperature sensor 15, in practice, the cooling fluid 16 temperature can be used as the main temperature indicator, based on which the number of throttled cylinder compressions at which no combustion takes place, and the injected fuel amount are determined, and the air temperature as second indicator, adjusting the injected fuel amount. Preferably, a higher temperature results in a reduction of the injected fuel amount. Also, the height above sea-level can be used as third indicator, adjusting the injected fuel amount. Preferably, a higher altitude results in a reduction of the injected fuel amount.

In can be seen in FIG. 6 that the first couple of HCCI combustions, in the cylinders denoted as CYL6, CYL2 and CYL4, are acceptable HCCI (CAI) cycles, non-knocking and totally acceptable from an NVH stand point of view.

Finally, the HCCI mode operation of the engine is followed by a spark ignition (SI) mode 106. The SI mode following the start sequence can include an emission strategy which in turn could include a lean, stoichiometric or rich mixture depending on the calibration.

Due to the inventive use of an HCCI mode at hot start conditions in a spark ignition engine, the number of throttled cylinder compressions can be kept low, while meeting NVH and knock requirements. Therefore, the torque-less initial phase will be kept short, which will be an advantageous for a driver of a vehicle in which the engine is provided. As an example, at very high temperatures the number of throttled cylinder compressions without combustion could be five and at normal conditions, (e.g. inlet air temp.=25° C., and cooling fluid temp.<50° C.), it could be two or three.

The invention claimed is:

1. A method for an engine with cylinders, each cylinder having a spark providing device, comprising:
   in connection to a start procedure of the engine, operating the engine in a controlled self-ignition mode comprising a plurality of controlled combustions without spark ignition, wherein a mixture of fuel and air supplied to said engine is made gradually richer.

2. The method according to claim 1, wherein said controlled combustion without spark ignition comprises homogeneous charge compression ignition (HCCI).

3. The method according to claim 2, wherein, when the engine is operated in said controlled self-ignition mode, a mixture of fuel and air supplied for the at least one controlled combustion is lean.

4. The method of claim 1 wherein said plurality of controlled combustions is at least partly dependent upon a temperature of air in an inlet manifold of the engine.

5. The method according to claim 4, wherein, after said controlled self-ignition mode, the engine is operated in a spark ignition (SI) mode.

6. The method according to claim 5, wherein, before said controlled self-ignition mode, a throttle valve of the engine is controlled so as to assume a not fully open position.

7. The method according to claim 6, wherein said not fully open position of the throttle valve is a fully closed position.

8. The method according to claim 6, wherein at least one fuel injector of the engine is controlled so that, when said throttle valve is in the not fully open position, an amount of fuel injected is equal to or less than a fuel injection threshold value.

9. The method according to claim 8, wherein said fuel injection threshold value corresponds to no injection of fuel.

10. The method according to claim 6, wherein an amount of throttled cylinder compressions, during which said throttle valve is controlled so as to assume the not fully open position, is dependent upon the temperature in said inlet manifold of the engine.

11. The method according to claim 10, wherein said amount of throttled cylinder compressions is increased with increased temperature in said inlet manifold of the engine.

12. The method according to claim 11, wherein the engine is operated in said controlled self-ignition mode during the start procedure when at least a part of the engine has a temperature that is higher than a threshold temperature.

13. The method according to claim 12, wherein the engine is operated in said controlled self-ignition mode during the start procedure when the air in said inlet manifold of the engine has a temperature that is higher than an inlet manifold air threshold temperature.

14. A method for improving performance of an internal combustion engine with at least one cylinder, at each of which at least one spark providing device for ignition being provided, comprising:

in connection to a start procedure of the internal combustion engine, operating the internal combustion engine in a controlled self-ignition mode comprising at least one controlled combustion without spark ignition, wherein said controlled combustion without spark ignition comprises homogeneous charge compression ignition (HCCI), wherein, when the internal combustion engine is operated in said controlled self-ignition mode, a mixture of fuel and air supplied for the at least one controlled combustion is lean, and wherein said controlled self-ignition mode comprises a plurality of controlled combustions without spark ignition, in connection to which said mixture of fuel and air is made gradually richer.

15. The method according to claim 14, wherein a number of controlled combustions without spark ignition is at least partly dependent upon an engine operating condition at the start procedure.

16. The method according to claim 15, wherein said engine operating condition is a temperature of an engine cooling fluid.

17. An internal combustion engine, comprising:
at least one throttle valve;
at least one fuel injector for injecting fuel to provide an air-fuel mixture in a cylinder;
at least one cylinder having at least one spark providing device for providing an ignition source to said cylinder; and
an engine controller that during an engine start operates said at least one throttle valve, said at least one fuel injector, and said at least one spark providing device to provide a controlled self-ignition mode comprising at least one controlled combustion without spark ignition, wherein said controlled self-ignition mode comprises a plurality of controlled combustions without spark ignition, and wherein during said engine start said air-fuel mixture is made gradually richer.

18. The internal combustion engine according to claim 17, wherein said at least one controlled combustion without spark ignition comprises homogeneous charge compression ignition (HCCI).

19. The internal combustion engine according to claim 18, wherein said engine controller adjusts said at least one throttle valve and said at least one fuel injector so that a lean air-fuel mixture is provided for combustion.

20. An internal combustion engine, comprising:
at least one cylinder having at least one spark providing device for ignition of an air-fuel mixture;
at least one throttle valve;
at least one fuel injector; and
an engine controller that during an engine start operates said at least one throttle valve, said at least one fuel injector, and said at least one spark providing device to provide a controlled self-ignition mode comprising at least one controlled combustion without spark ignition, wherein said engine controller adjusts said at least one spark providing device, said at least one throttle valve, and said at least one fuel injector so that said controlled self-ignition mode comprises a plurality of controlled combustions without spark ignition, the air-fuel mixture supplied to said internal combustion engine made gradually richer during said controlled self-ignition mode.

21. The internal combustion engine according to claim 20, wherein said engine controller determines a number of controlled combustions without spark ignition at least partly based on an engine operating condition at an engine start procedure.

22. The internal combustion engine according to claim 21, wherein said engine operating condition is a temperature of a cooling fluid of the internal combustion engine.

23. The internal combustion engine according to claim 22, wherein said engine controller determines said number of controlled combustions without spark ignition at least partly based on a temperature of air in an inlet manifold of the internal combustion engine.

24. The internal combustion engine according to claim 23, wherein said engine controller adjusts said at least one spark providing device, said at least one throttle valve, and said at least one fuel injector after ending said controlled self-ignition mode to provide a spark ignition (SI) mode for the internal combustion engine.

25. The internal combustion engine according to claim 24, wherein said engine controller adjusts said at least one throttle valve to a partially open position before entering said controlled self-ignition mode.

26. The internal combustion engine according to claim 24, wherein said controller adjusts said at least one throttle valve to a fully closed position.

27. The internal combustion engine according to claim 25, wherein said engine controller adjusts said at least one fuel injector so that an amount of fuel injected is equal to or less than a fuel injection threshold value.

28. The internal combustion engine according to claim 27, wherein said fuel injection threshold value corresponds to no injection of fuel.

29. The internal combustion engine according to claim 28, wherein said engine controller operates said internal combustion engine for an amount of throttled cylinder compressions, during which said at least one throttle valve is controlled so as to assume a not fully open position, said amount of throttled cylinder compressions at least partly based on said temperature in said inlet manifold of the internal combustion engine.

30. The internal combustion engine according to claim 29, wherein said engine controller adjusts said at least one spark providing device, the at least one throttle valve, and said at least one fuel injector in said controlled self-ignition mode during an engine start when at least a part of the internal combustion engine has a temperature that is higher than a threshold temperature.

31. The internal combustion engine according to claim 30, wherein said engine controller adjusts said at least one spark providing device, said at least one throttle valve, and said at least one fuel injector in said controlled self-ignition mode during an engine start when said air in said inlet manifold of the internal combustion engine has a temperature that is higher than an inlet manifold air threshold temperature.

* * * * *